United States Patent
Han et al.

(10) Patent No.: US 10,701,715 B2
(45) Date of Patent: Jun. 30, 2020

(54) DATA TRANSMISSION METHOD, APPARATUS, AND SYSTEM FOR PACKET DATA CONVERGENCE PROTOCOL (PDCP) DATA PACKETS

(71) Applicant: Huawei Technologies Co., Ltd., Shenzhen (CN)

(72) Inventors: Xiaojiang Han, Xi'an (CN); Haiyan Luo, Shanghai (CN); Guanchen Li, Shanghai (CN); Kejian Sun, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 59 days.

(21) Appl. No.: 16/047,860

(22) Filed: Jul. 27, 2018

(65) Prior Publication Data

US 2018/0376488 A1    Dec. 27, 2018

Related U.S. Application Data

(63) Continuation of application No. PCT/CN2016/087022, filed on Jun. 24, 2016.

(30) Foreign Application Priority Data

Jan. 30, 2016    (WO) ................ PCT/CN2016/072926

(51) Int. Cl.
*H04W 72/12*    (2009.01)
*H04W 80/02*    (2009.01)
(Continued)

(52) U.S. Cl.
CPC ... *H04W 72/1242* (2013.01); *H04W 28/0273* (2013.01); *H04W 28/06* (2013.01);
(Continued)

(58) Field of Classification Search
CPC . H04W 72/1242; H04W 80/02; H04W 80/08; H04W 72/121; H04W 28/10; H04W 28/06; H04W 28/0273; H04W 24/10
See application file for complete search history.

(56) References Cited

U.S. PATENT DOCUMENTS

| 2012/0281564 | A1 | 11/2012 | Zhang et al. | |
| 2015/0326456 | A1* | 11/2015 | Dudda | H04L 43/062 370/252 |
| 2018/0176974 | A1* | 6/2018 | Fujishiro | H04L 5/001 |

FOREIGN PATENT DOCUMENTS

| CN | 101932091 A | 12/2010 |
| CN | 102685816 A | 9/2012 |

(Continued)

OTHER PUBLICATIONS

"3rd Generation Partnership Project;Technical Specification Group Radio Access Network; Evolved Universal Terrestrial Radio Access (E-UTRA);Radio Resource Control (RRC);Protocol specification(Release 13)," 3GPP TS 36.331 V13.0.0 (Dec. 2015), pp. 1-252,3rd Generation Partnership Project—Valbonne, France (Dec. 2015).

(Continued)

*Primary Examiner* — Thai Nguyen
(74) *Attorney, Agent, or Firm* — Leydig, Voit & Mayer, Ltd.

(57) ABSTRACT

The present application discloses a data transmission method, including: configuring, by a first network element, a Packet Data Convergence Protocol (PDCP) reordering time for a terminal; sending, by the first network element, the PDCP reordering time of the terminal to a second network element; sending, by the first network element, a PDCP data packet of the terminal to the second network element, where the PDCP reordering time of the terminal is used to determine a transmission priority of the PDCP data (Continued)

packet of the terminal on the second network element. According to embodiments of the present application, a data packet loss can be reduced.

17 Claims, 6 Drawing Sheets

(51) Int. Cl.
    *H04W 28/02*     (2009.01)
    *H04W 28/06*     (2009.01)
    *H04W 28/10*     (2009.01)
    *H04W 80/08*     (2009.01)
    *H04W 24/10*     (2009.01)

(52) U.S. Cl.
    CPC ......... *H04W 28/10* (2013.01); *H04W 72/121* (2013.01); *H04W 80/02* (2013.01); *H04W 80/08* (2013.01); *H04W 24/10* (2013.01)

(56) References Cited

FOREIGN PATENT DOCUMENTS

| CN | 104349385 A | 2/2015 |
|---|---|---|
| CN | 104935414 A | 9/2015 |
| WO | 2015133767 A1 | 9/2015 |
| WO | 2015170298 A1 | 11/2015 |

OTHER PUBLICATIONS

"3rd Generation Partnership Project;Technical Specification Group Radio Access Network; Evolved Universal Terrestrial Radio Access (E-UTRA);Packet Data Convergence Protocol (PDCP) specification(Release 13)," pp. 1-36, 3GPP TS 36323 V13.0.0,3rd Generation Partnership Project—Valbonne, France (Dec. 2015).

"LTE Small Cell Enhancement by Dual Connectivity," Wireless World Research Forum, Working Group C, Communication Architectures and Technologies, White Paper, Version 1.1, pp. 1-22 (Nov. 15, 2014).

"3rd Generation Partnership Project;Technical Specification Group Radio Access Network; Evolved Universal Terrestrial Radio Access (E-UTRA);Study on Small Cell Enhancements for E-UTRA and E-UTRAN—Higher layer aspects(Release 12)," 3GPP TR 36.842 V1.0.0 (Nov. 2013), pp. 1-68, 3rd Generation Partnership Project —Valbonne, France (Nov. 2013).

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.8.0, pp. 1-456, 3rd Generation Partnership Project—Valbonne, France (Dec. 2015).

* cited by examiner

DATA TRANSMISSION METHOD, APPARATUS, AND SYSTEM FOR PACKET DATA CONVERGENCE PROTOCOL (PDCP) DATA PACKETS

CROSS-REFERENCE TO RELATED APPLICATIONS

This application is a continuation of International Application No. PCT/CN2016/087022, filed on Jun. 24, 2016, which claims priority to International Application No. PCT/CN2016/072926, filed on Jan. 30, 2016. The disclosures of the aforementioned applications are hereby incorporated by reference in their entireties.

TECHNICAL FIELD

The present application relates to the field of communications technologies, and in particular, to a data transmission method, an apparatus, and a system.

BACKGROUND

A Packet Data Convergence Protocol (PDCP) splitting technology is a technology in which a PDCP layer is used as an anchor, data packets on a bearer are split at a protocol layer below the PDCP layer, and the data packets are sent to a terminal by using different air interfaces.

In the technology, after data of a same terminal is processed at the PDCP layer, obtained PDCP data packets may be split to different network elements for processing and sent to the terminal. After receiving the data packets, the terminal aggregates the data packets at the PDCP layer. In the foregoing process, there is a difference between processing speeds of the different network elements, and a delay is generated during data interaction. Therefore, moments at which the split data packets arrive at the terminal are often different, and this may result in a packet loss.

SUMMARY

Embodiments of the present application provide a data transmission method, an apparatus, and a system, so as to reduce a data packet loss.

According to a first aspect, an embodiment of the present application provides a data transmission method, including:

after configuring a PDCP reordering time for a terminal, sending, by a first network element, the PDCP reordering time of the terminal to a second network element; sending a PDCP data packet of the terminal to the second network element, where the PDCP reordering time of the terminal is used to determine a transmission priority of the PDCP data packet of the terminal on the second network element.

It can be learned that after configuring the PDCP reordering time of the terminal for the terminal, the first network element further sends the PDCP reordering time of the terminal to the second network element. In comparison with the prior art, in this solution, the second network element may determine the transmission priority of the PDCP data packet of the terminal according to the PDCP reordering time of the terminal, so that a data packet loss is reduced.

In a possible design, the method further includes:

when the first network element receives an instruction, sent by the second network element, that is used to instruct to send a decreasing quantity of PDCP data packets or stop sending a PDCP data packet to the second network element, sending, by the first network element, fewer PDCP data packets or stopping sending a PDCP data packet to the second network element. Therefore, a congestion problem of a channel of the second network element is resolved, and a data packet loss is further reduced.

In a possible design, a specific implementation in which the first network element sends the PDCP reordering time of the terminal to the second network element is: sending, by the first network element, an aggregation request to the second network element, where the aggregation request carries the PDCP reordering time of the terminal.

In a possible design, after the sending, by the first network element, an aggregation request to the second network element, the method further includes: receiving, by the first network element, a response message that is sent by the second network element and that is of the aggregation request, where the response message includes at least one of initial flow control information of the terminal, traffic that is recommended by the second network element and that is of sending the PDCP data packet by the first network element to the second network element, and a rate that is recommended by the second network element and that is of sending the PDCP data packet by the first network element to the second network element, and the sending, by the first network element, a PDCP data packet of the terminal to the second network element includes:

sending, by the first network element, the PDCP data packet of the terminal to the second network element according to at least one of the initial flow control information of the terminal, the recommended traffic, and the recommended rate.

In a possible design, after the sending, by the first network element, the PDCP data packet of the terminal to the second network element according to at least one of the initial flow control information of the terminal, the recommended traffic, and the recommended rate, the method further includes:

receiving, by the first network element, adjusted flow control information of the terminal sent by the second network element periodically or by means of an event trigger. A capability of the terminal in the first network element is precisely reported by using the flow control information, so that the first network element can send split data to the terminal according to the capability of the terminal in a timely manner, and a data packet loss is further reduced.

In a possible design, the flow control information includes at least one of a rate of splitting the PDCP data packet of the terminal by the second network element, a quantity of PDCP data packets of the terminal split by the second network element, and a packet length of the PDCP data packet of the terminal split by the second network element, the rate of splitting the PDCP data packet of the terminal is determined by the second network element according to a capability of sending data by using an air interface of the terminal and a buffer size used by the terminal on the second network element, the quantity of the split PDCP data packets of the terminal is determined by the second network element according to a quantity of times that the terminal can be scheduled, and the packet length of the split PDCP data packet of the terminal is determined by the second network element according to a capability of sending the data packet by the terminal.

In a possible design, the method further includes:

if at least one PDCP data packet of the terminal fails to be sent within a preset quantity of retransmission times, sending, by the first network element, indication information to the second network element, where the indication information includes a sequence number of the at least one PDCP data packet, and the indication information is used to instruct the second network element to trigger the terminal to reconfigure the first network element and instruct the second network element to deliver the at least one PDCP data packet to the first network element according to the sequence number of the at least one PDCP data packet. After some data packets of the terminal fail to be sent, the data packets are re-sent in a timely manner, so that a data packet loss is further reduced.

According to a second aspect, an embodiment of the present application provides a data transmission method, including:

receiving, by a second network element, a PDCP reordering time of a terminal sent by a first network element; receiving a PDCP data packet of the terminal sent by the first network element; and determining, by the second network element, a transmission priority of the PDCP data packet of the terminal according to the PDCP reordering time of the terminal. It can be learned that after configuring the PDCP reordering time of the terminal for the terminal, the first network element further sends the PDCP reordering time of the terminal to the second network element. In comparison with the prior art, in this solution, the second network element may determine the transmission priority of the PDCP data packet of the terminal according to the PDCP reordering time of the terminal, so that a data packet loss is reduced.

In a possible design, a specific implementation in which the second network element determines the transmission priority of the PDCP data packet of the terminal according to the PDCP reordering time of the terminal is: determining, by the second network element, remaining duration of the PDCP reordering time of the terminal; and determining, by the second network element, the transmission priority of the PDCP data packet of the terminal according to the remaining duration, where the remaining duration is a difference between the PDCP reordering time and a waiting time of the PDCP data packet on the second network element.

In a possible design, when the remaining duration of the PDCP reordering time of the terminal is less than remaining duration of a PDCP reordering time of another terminal, the transmission priority of the PDCP data packet of the terminal is greater than a transmission priority of a PDCP data packet of the another terminal; or when the remaining duration of the PDCP reordering time of the terminal is greater than remaining duration of a PDCP reordering time of another terminal, the transmission priority of the PDCP data packet of the terminal is less than a transmission priority of a PDCP data packet of the another terminal.

In a possible design, the method further includes:

when the remaining duration of the PDCP reordering time of the terminal is less than or equal to a preset threshold, instructing, by the second network element, the first network element to send a decreasing quantity of PDCP data packets or stop sending a PDCP data packet to the second network element. It can be learned that when a channel of the second network element is congested, the second network element instructs the first network element to send a decreasing quantity of PDCP data packets or stop sending a PDCP data packet to the second network element, so that a data packet loss is further reduced.

In a possible design, the method further includes:

when a difference between a sequence number of a latest PDCP data packet received by the second network element and a sequence number of an un-sent earliest PDCP data packet received by the second network element is greater than or equal to a maximum sending quantity of PDCP data packets within the PDCP reordering time of the terminal, instructing, by the second network element, the first network element to send a decreasing quantity of PDCP data packets or stop sending a PDCP data packet to the second network element, where the latest PDCP data packet and the earliest PDCP data packet are PDCP data packets on a same bearer of the terminal.

It can be learned that when a channel of the second network element is congested, the second network element instructs the first network element to send a decreasing quantity of PDCP data packets or stop sending a PDCP data packet to the second network element, so that a data packet loss is further reduced.

In a possible design, a specific implementation in which the second network element receives the PDCP reordering time of the terminal sent by the first network element is: receiving, by the second network element, an aggregation request sent by the first network element, where the aggregation request carries the PDCP reordering time of the terminal.

In a possible design, after the receiving, by the second network element, an aggregation request sent by the first network element, the method further includes:

sending, by the second network element, a response message for the aggregation request to the first network element, where the response message includes traffic or a rate that is recommended by the second network element and that is of sending the PDCP data packet by the first network element to the second network element.

According to a third aspect, the present application provides a network element, including modules that are configured to perform the method according to the first aspect.

According to a fourth aspect, the present application provides a network element, including modules that are configured to perform the method according to the second aspect.

According to a fifth aspect, the present application provides a network element, the network element includes a processor, and the processor is configured to support the network element to perform corresponding functions in the data transmission method according to the first aspect. The network element may further include a memory. The memory is coupled to the processor, and stores necessary program instructions and data of the network element. The network element may further include a communications interface used for communication between the network element and another device or a communications network.

According to a sixth aspect, the present application provides a network element, the network element includes a processor, and the processor is configured to support the network element to perform corresponding functions in the data transmission method according to the second aspect. The network element may further include a memory. The memory is coupled to the processor, and stores necessary program instructions and data of the network element. The network element may further include a communications interface used for communication between the network element and another device or a communications network.

According to a seventh aspect, the present application provides a computer storage medium that is configured to store a computer software instruction used by the foregoing network element according to the fifth aspect, and the computer software instruction includes a program designed for performing the foregoing aspect.

According to an eighth aspect, the present application provides a computer storage medium that is configured to store a computer software instruction used by the foregoing network element according to the sixth aspect, and the computer software instruction includes a program designed for performing the foregoing aspect.

In comparison with the prior art, in a solution provided in the present application, a PDCP reordering time of a terminal may be considered during data transmission, so that a data packet loss can be reduced.

These aspects or another aspect of the present application is clearer and more comprehensible in description in the following embodiments.

BRIEF DESCRIPTION OF DRAWINGS

To describe the technical solutions in the embodiments of the present application more clearly, the following briefly describes the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DESCRIPTION OF EMBODIMENTS

Figure 1:
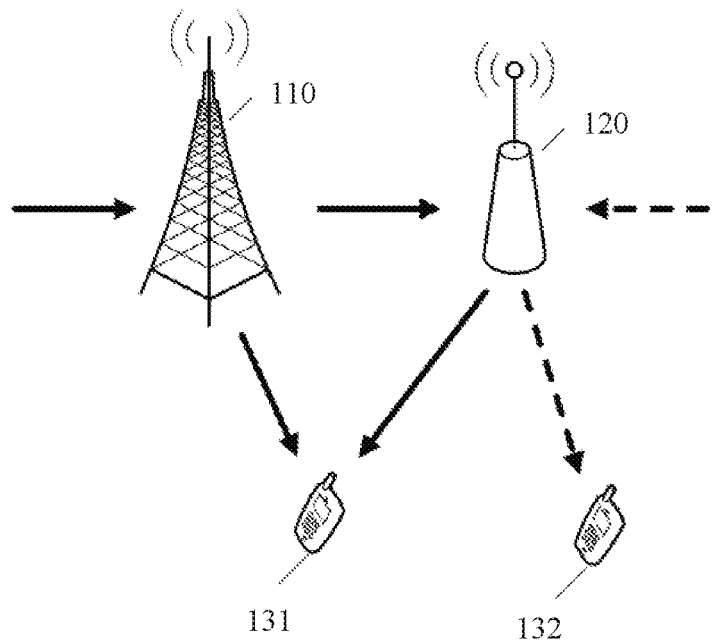
FIG. 1 is a schematic diagram of a communications system according to an embodiment of the present application.

To make a person skilled in the art understand the technical solutions in the present application better, the following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

In the specification, claims, and accompanying drawings of the present application, the terms "first", "second", "third", "fourth", and so on are intended to distinguish between different objects but do not indicate a particular order. In addition, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this specification means that a specific characteristic, structure, or feature described with reference to the embodiment may be included in at least one embodiment of the present application. This phrase appearing in various locations of this specification does not necessarily mean a same embodiment, or an independent or a candidate embodiment that is exclusive to another embodiment. It may be explicitly or implicitly understood by a person skilled in the art that the embodiments described in this specification may be combined with another embodiment.

In the following, some terms in this application are described, so as to help a person skilled in the art have a better understanding.

(1) A terminal, also referred to as a user equipment (UE), is a device that provides a user with voice and/or data connectivity, for example, a handheld device or an in-vehicle device having a wireless connection function. For example, a common terminal includes a mobile phone, a tablet computer, a notebook computer, a palmtop computer, a mobile Internet device (MID), and a wearable device such as a smart watch, a smart band, and a pedometer.

(2) A network element refers to a node device on a network side. For example, the network element may be a radio access network (RAN) device on an access network side in a cellular network. The RAN device is a device that connects a terminal to a wireless network, and includes but is not limited to an evolved NodeB (eNB), a radio network controller (RNC), a NodeB (NB), a base station controller (BSC), a base transceiver station (BTS), a home NodeB (for example, a Home evolved NodeB or a Home NodeB (HNB)), and a baseband unit (BBU). For another example, the network element may also be a node device in a wireless local area network (WLAN), for example, an access controller (AC), a gateway, or a WiFi access point (AP).

(3) A PDCP splitting technology is a technology in which a PDCP layer is used as an anchor, data packets on a bearer are split at a protocol layer below the PDCP layer, and the data packets are sent to a terminal by using different air interfaces. In this technology, the PDCP anchor may be located on a RAN device in a cellular network, and an entity that undertakes a splitting function may be located on the RAN device in the cellular network, for example, a PDCP splitting system is a dual connectivity (DC) system, or an entity that undertakes a splitting function may be located on a network element in a WLAN, for example, the PDCP splitting system is a Long Term Evolution (LTE) and WIFI aggregation (LWA) system.

(4) A PDCP reordering time is a parameter configured by a network side for a terminal, for example, the network side configures the parameter for the terminal by using a t-Reordering information element. The terminal uses the parameter to maintain a PDCP reordering window. In the reordering window, the terminal buffers a received PDCP data packet, and reorders the buffered PDCP data packet according to a sequence number, so that a problem of a packet loss or demodulating data in error that is caused by out-of-order of the PDCP data packet is resolved. Alternatively, the terminal may use the parameter to maintain a PDCP reordering timer whose function is the same as that of the foregoing PDCP reordering window.

(5) "Multiple" means two or more. The term "and/or" is an associative relationship for describing associated objects and indicates that three relationships may exist. For example, A and/or B may represent the following three cases: Only A exists, both A and B exist, and only B exists. The character "/" generally indicates an "or" relationship between the associated objects.

The following describes the embodiments of this application with reference to accompanying drawings.

Referring to FIG. 1, FIG. 1 is a schematic diagram of a communications system according to an embodiment of the present application. The communications system shown in FIG. 1 includes a first network element 110 and a second network element 120. As a PDCP anchor, the first network element 110 performs PDCP processing on data of a terminal 131 to obtain PDCP data packets, and then may send some PDCP data packets to the second network element 120, so that the PDCP data packets may be sent to the terminal 131 by using the first network element 110 and the second network element 120 separately. After receiving these data packets, the terminal 131 completes aggregation at a PDCP layer. Because of a processing speed difference between the first network element 110 and the second network element 120 and a data interaction delay, moments at which the data packets arrive at the terminal 131 by using the first network element 110 and the second network element 120 are often different, thereby causing a problem of out-of-order of the PDCP data packets, and causing a problem of demodulating data in error or a packet loss. To reduce occurrence of the problem, a PDCP reordering time may be configured for the terminal 131. Within the reordering time, the terminal buffers the PDCP data packet, so that the problem of out-of-order of the PDCP data packets can be resolved to some extent.

However, in actual application, there are often a plurality of terminals, and the second network element 120 may undertake data transmission of more than one terminal. In addition, processing capabilities or buffer capabilities of these terminals are often different, and therefore PDCP reordering time configurations of the terminals may be different. For example, the second network element 120 undertakes data transmission of the terminal 131 and a terminal 132, where a PDCP reordering time of the terminal 131 is 200 ms, and a PDCP reordering time of the terminal 132 is 20 ms. When scheduling the terminal 131 and the terminal 132, the second network element 120 performs scheduling according to an existing scheduling mechanism. For example, a specific quality of service (QoS) requirement of the terminal 131 is relatively high, the terminal 131 is scheduled first, and when the terminal 132 is scheduled, data of the terminal 132 is discarded because the data is out of a PDCP reordering window. It can be learned that the existing scheduling mechanism still cannot resolve a packet loss problem in a PDCP splitting system.

In this embodiment of the present application, in consideration of that PDCP reordering times of the terminals may be different, the reordering times are used to adjust transmission priorities of the terminals, so that occurrence of a packet loss may be reduced. Specifically, the first network element in which the PDCP anchor is located may send the PDCP reordering time configured for the terminal to the second network element that undertakes PDCP splitting, so that the second network element may determine the transmission priority of the terminal according to the parameter. In this way, when undertaking data transmission of a plurality of terminals, the second network element may determine, according to PDCP reordering times of the terminals, data of which terminal is to be transmitted first, so that the terminal receives the data in a PDCP reordering window.

This solution may be applicable to any system that uses a PDCP splitting technology, such as a DC system and an LTE and WiFi link aggregation (LWA) system. In the DC system, both the first network element and the second network element are RAN devices. An LTE system is used as an example, the first network element is a master eNB (MeNB), and the second network element is a secondary eNB (SeNB). In the LWA system, the first network element is a RAN device, and the second network element is a wireless local area network termination (WT). The WT is a logical network element, and may be deployed on a WLAN AC, a WLAN gateway, or a WLAN AP, or may be independently disposed, and this is not limited in the present application.

The following describes the embodiments of the present application in detail with reference to accompanying drawings, so that a person skilled in the art understands the embodiments of the present application.

Figure 2:
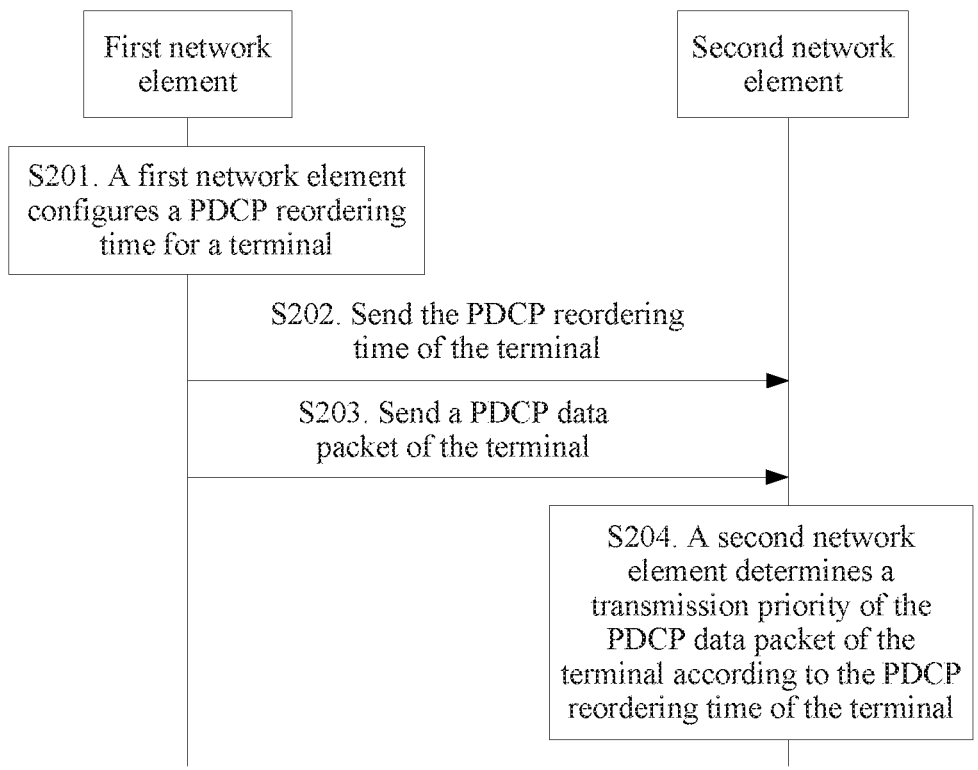
FIG. 2 is a schematic flowchart of a data transmission method according to an embodiment of the present application.

As shown in FIG. 2, a data transmission method provided in an embodiment of the present application includes the following steps:

S201. A first network element configures a PDCP reordering time for a terminal.

S202. The first network element sends the PDCP reordering time of the terminal to a second network element.

S203. The first network element sends a PDCP data packet of the terminal to the second network element.

S204. After receiving the PDCP reordering time and the PDCP data packet of the terminal that are sent by the first network element, the second network element determines a transmission priority of the PDCP data packet of the terminal according to the PDCP reordering time.

In the foregoing step S201, the first network element may determine the PDCP reordering time of the terminal according to a processing capability or a buffer capability of the terminal. The terminal may report capability information such as the processing capability or the buffer capability of the terminal to the first network element, so that the first network element configures the PDCP reordering time. Alternatively, the first network element may configure the PDCP reordering time autonomously, for example, may configure the PDCP reordering time of the terminal according to information such as a current service type of the terminal.

The PDCP reordering time is sent to the terminal by using PDCP configuration information. The PDCP configuration information may carry a t-Reordering information element, which is used to indicate the PDCP reordering time. For example, the PDCP reordering time may include 0 ms, or a time that is an integer multiple of 20 ms, for example, 20 ms, 40 ms, . . . , or 300 ms. Alternatively, the PDCP reordering time may be, for example, 500 ms or 750 ms. In addition, corresponding space may be reserved for configuration of another required time.

It should be noted that the PDCP reordering time in this application may be time information, or may be other information that can reflect the PDCP reordering time, for example, a sequence number interval of the PDCP data packet that can reflect the PDCP reordering time. For example, 20 data packets may be sent within the PDCP reordering time, and the sequence number interval 20 may be used to reflect the PDCP reordering time.

In the foregoing step S202, the first network element may directly send the PDCP reordering time configured for the terminal to the second network element, or may convert the PDCP reordering time into another parameter that can reflect the reordering time and send the parameter to the second network element, for example, the reordering time is converted into a PDCP sequence number (SN).

The first network element may add the PDCP reordering time to an existing message exchanged between the first network element and the second network element, and send the message to the second network element. For example, the PDCP reordering time is sent to the second network element by using an aggregation request. For another example, in a DC system, the reordering time may be sent to the second network element by using an SeNB addition request; in an LWA system, the reordering time may be sent to the second network element by using a WT addition request or a WT modification request. In addition, alternatively, a message may be newly added to send the PDCP reordering time.

In the foregoing step S203, the first network element performs PDCP processing on data of the terminal to obtain PDCP data packets, and then may send some PDCP data packets to the second network element, so as to send the PDCP data packets to the terminal through the second network element, and send remaining PDCP data packets to the terminal autonomously. Optionally, the first network element may send all PDCP data packets to the second network element.

Figure 3:
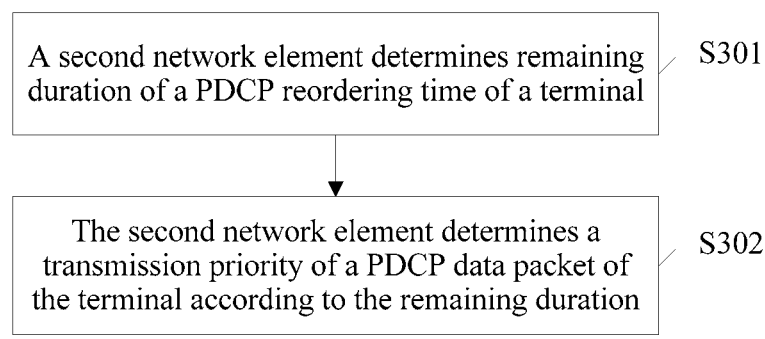
FIG. 3 is a schematic flowchart of another data transmission method according to an embodiment of the present application.

Referring to FIG. 3, in the foregoing step S204, that the second network element determines a transmission priority of the PDCP data packet of the terminal according to the PDCP reordering time may include the following process:

S301. The second network element determines remaining duration of the PDCP reordering time of the terminal.

S302. The second network element determines the transmission priority of the PDCP data packet of the terminal according to the remaining duration, where the remaining duration of the PDCP reordering time is a difference between the PDCP reordering time and a waiting time of the PDCP data packet on the second network element.

Larger remaining duration of the PDCP reordering time leads to a lower transmission priority of the PDCP data packet of the terminal. That is, when the remaining duration of the PDCP reordering time of the terminal is less than remaining duration of a PDCP reordering time of another terminal, the transmission priority of the PDCP data packet of the terminal is greater than a transmission priority of a PDCP data packet of the another terminal. When the remaining duration of the PDCP reordering time of the terminal is greater than remaining duration of a PDCP reordering time of another terminal, the transmission priority of the PDCP data packet of the terminal is less than a transmission priority of a PDCP data packet of the another terminal.

For example, the second network element may determine the remaining duration of the PDCP reordering time of the terminal according to a formula $T=T3-(T2-T1)$, where T is the remaining duration of the PDCP reordering time of the terminal, T3 is the PDCP reordering time of the terminal, T2 is a current system time, and T1 is a time at which the second network element receives the PDCP data packet of the terminal. It is assumed that a PDCP reordering time of a first terminal is 100 ms, a time at which the second network element receives a PDCP data packet of the first terminal is 9:56:30:30, a PDCP reordering time of a second terminal is 40 ms, a time at which the second network element receives a PDCP data packet of the second terminal is 9:56:30:60, and the current system time is 9:56:30:70. According to the foregoing formula, the second network element determines that remaining duration of the PDCP reordering time of the first terminal is 60 ms, and remaining duration of the PDCP reordering time of the second terminal is 30 ms. The remaining duration of the PDCP reordering time of the second terminal is less than the remaining duration of the PDCP reordering time of the first terminal, and therefore it is more urgent to transmit the PDCP data packet of the second terminal by comparing the second terminal with the first terminal. Therefore, a transmission priority of the PDCP data packet of the second terminal is higher than a transmission priority of the PDCP data packet of the first terminal, and in this case, the second network element schedules the PDCP data packet of the second terminal.

In addition, when PDCP reordering times of two terminals have same remaining duration, scheduling priorities of the two terminals may be determined according to an existing scheduling mechanism.

Optionally, remaining durations may not be compared between terminals, and a remaining duration threshold is directly set. When remaining duration of a PDCP reordering time of a terminal is less than the threshold, a scheduling priority of the terminal is high, that is, a PDCP data packet of the terminal is scheduled first. When remaining durations of PDCP reordering times of a plurality of terminals are less than the threshold, a scheduling priority may be determined according to an existing scheduling mechanism, or a terminal with smallest remaining duration may be scheduled first according to the foregoing method. The threshold may be set according to a requirement of an operator, and is not limited.

Optionally, the second network element may send, to the first network element, at least one of initial flow control information of the terminal, a PDCP data packet traffic that is recommended by the first network element and may be borne by the second network element, and a PDCP data packet rate that is recommended by the first network element and may be borne by the second network element. For example, after receiving an aggregation request sent by the first network element, the second network element may add the initial flow control information of the terminal, the traffic that is recommended by the second network element and that is of sending the PDCP data packet by the first network element to the second network element, or rate that is recommended by the second network element and that is of sending the PDCP data packet by the first network element to the second network element into a response message. In this way, the first network element sends the PDCP data packet of the terminal to the second network element according to at least one of the initial flow control information of the terminal, the recommended traffic, and the recommended rate.

Optionally, the second network element may accept the aggregation request of the first network element, or may reject the aggregation request of the first network element, and inform the first network element by using the response message of the aggregation request. The first network element sends the PDCP data packet to the second network element when the second network element accepts the aggregation. The second network element may determine, in any one of the following manners, whether to receive the aggregation request of the first network element: (1) The second network element determines whether a current air interface resource of the second network element is sufficient to bear the terminal. (2) The second network element determines whether a quantity of terminals for current PDCP splitting is greater than or equal to a preset threshold. (3) The second network element determines whether remaining duration of a PDCP reordering time of a currently borne terminal is less than or equal to preset duration. (4) The second network element determines a service delay of the terminal and PDCP splitting traffic according to the PDCP reordering time of the terminal and a QoS parameter of the terminal, and the second network element determines whether the second network element satisfies service delay and traffic requirements of the terminal, and so on. If the current air interface resource of the second network element is sufficient, or the quantity of terminals for the current PDCP splitting is less than the preset threshold, or the remaining duration of the PDCP reordering time of the currently borne terminal is greater than the preset duration, or when the second network element satisfies the service delay and traffic requirements of the terminal, the second network element determines that the second network element can bear the terminal, and accepts the aggregation request of the first network element. If the second network element cannot bear the terminal, the second network element sends a reject response for the aggregation request to the first network element, where the reject response is used to notify the first network element that the second network element cannot bear the terminal. After receiving the reject response, the first network element may send an aggregation request to another network element, or may perform no operation.

In addition, when a channel of a bearer of the second network element for the terminal is congested, the first network element may be further instructed to perform flow control on the PDCP data packet. For example, this may be implemented in the following manner:

When a difference between a sequence number of a latest PDCP data packet received by the second network element and a sequence number of an un-sent earliest PDCP data packet received by the second network element is greater than or equal to a maximum sending quantity of PDCP data packets within the PDCP reordering time of the terminal, the second network element instructs the first network element to send a decreasing quantity of PDCP data packets or stop sending a PDCP data packet to the second network element, where the latest PDCP data packet and the earliest PDCP data packet are PDCP data packets on a same bearer of the terminal.

Optionally, the maximum sending quantity of PDCP data packets within the PDCP reordering time of the terminal may be determined by the second network element according to the PDCP reordering time of the terminal. For example, Maximum sending quantity of PDCP data packets=PDCP reordering time of the terminal/Delay of the PDCP data packet of the terminal. It is assumed that the PDCP reordering time of the terminal is 60 ms, and the delay of the PDCP data packet of the terminal is 1 ms, the maximum sending quantity of PDCP data packets is equal to 60. Alternatively, the maximum sending quantity of PDCP data packets within the PDCP reordering time of the terminal may be preset by the second network element. This is not limited in the present application.

For example, It is assumed that the sequence number of the latest PDCP data packet is 20, the sequence number of the earliest PDCP data packet is 5, and the maximum sending quantity of PDCP data packets within the PDCP reordering time of the terminal is 10, it can be learned that the difference between the sequence number of the latest PDCP data packet and the sequence number of the earliest PDCP data packet is greater than the maximum sending quantity of PDCP data packets within the PDCP reordering time of the terminal. In this case, the bearer channel that is of the second network element and in which the foregoing PDCP data packet of the terminal is located is congested, and therefore the second network element instructs the first network element to send a decreasing quantity of PDCP data packets or stop sending a PDCP data packet to the second network element. When the first network element receives the instruction, sent by the second network element, that is used to instruct to send a decreasing quantity of PDCP data packets or stop sending a PDCP data packet to the second network element, the first network element sends a decreasing quantity of PDCP data packets or stops sending a PDCP data packet to the second network element, so that a congestion problem of the channel of the second network element is resolved, and a data packet loss is further reduced.

In addition, the foregoing congestion may be resolved in the following manner:

When the remaining duration of the PDCP reordering time of the terminal is less than or equal to a preset threshold, the second network element instructs the first network element to send a decreasing quantity of PDCP data packets or stop sending a PDCP data packet to the second network element.

For example, the foregoing preset threshold may be equal to 0 ms, 0.1 ms, 1 ms, 2 ms, or another value.

For example, when remaining duration of a PDCP reordering time of a terminal is less than or equal to the preset threshold, it indicates that PDCP data packets that are of the terminal and that are borne by the second network element are overloaded, and a channel of the second network element is congested. In this case, the second network element instructs the first network element to send a decreasing quantity of PDCP data packets or stop sending a PDCP data packet to the second network element. When the first network element receives the instruction, sent by the second network element, that is used to instruct to send a decreasing quantity of PDCP data packets or stop sending a PDCP data packet to the second network element, the first network element sends a decreasing quantity of PDCP data packets or stops sending a PDCP data packet to the second network element, so that a congestion problem of the channel of the second network element is resolved, and a data packet loss is further reduced.

Optionally, the second network element may send adjusted flow control information of the terminal to the first network element. For example, after the terminal accesses the first network element, the second network element sends the adjusted flow control information of the terminal to the first network element periodically or by means of an event trigger. A periodic mechanism may be that the second network element sends the flow control information of the terminal to the first network element periodically according to a period agreed with the first network element, and an event trigger mechanism may be that the second network element sends the flow control information of the terminal to the first network element only when the flow control information of the terminal is changed and adjusted.

The flow control information includes at least one of a rate at which the second network element may split the PDCP data packet of the terminal, a quantity of PDCP data packets of the terminal that may be split by the second network element, and a packet length of the PDCP data packet of the terminal that may be split by the second network element. A method for calculating the rate at which the second network element may split the PDCP data packet of the terminal is as follows: The second network element controls the flow control information according to a rate of successfully sending data of a current interface of the terminal and a size or a quantity of to-be-sent data packets of the terminal that are in a buffer of the first network element. When data of the terminal in the buffer is greater than data that can be transmitted in N flow control reporting periods, a traffic value in current flow control information is reduced; if data in the buffer is greater than data that can be transmitted in M flow control reporting periods, a traffic value in current flow control information is adjusted to 0, which indicates that no data needs to be split in a next period. When data in the buffer is less than data that can be transmitted in N flow control reporting periods, data is split to the second network element in a next flow control period according to data that can be transmitted in one flow control reporting period. N and M are different thresholds, and N is an integer greater than or equal to M. A method for calculating a maximum data packet of the terminal that may be split by the second network element is as follows: The second network element calculates, according to a QoS scheduling result in preceding several flow control periods, an opportunity that a channel may be occupied in each flow control period, so as to determine a quantity of data packets of the terminal that may be sent. When a quantity of data packets of the terminal in the buffer is greater than a quantity of data packets that can be transmitted in N flow control reporting periods, a quantity of flow packets in current flow control information is reduced; if a quantity of data packets in the buffer is greater than a quantity of data packets that can be transmitted in M flow control reporting periods, a quantity of flow packets in current flow control information is adjusted to 0, which indicates that no data packet needs to be split in a next period. When a quantity of data packets in the buffer is less than a quantity of data packets that can be transmitted in N flow control reporting periods, data is split to the second network element in a next flow control period according to a quantity of data packets that can be transmitted in one flow control reporting period. A method for calculating a maximum data packet length of the UE that can be split by the second network element is as follows: The second network element determines, according to a service agreement of the UE in a WiFi cell, a maximum PDCP packet length that can be supported by the second network element, and sends the length to a PCC.

Optionally, when at least one PDCP data packet of the terminal fails to be sent within a preset quantity of retransmission times, in this case, the first network element is not available for the terminal, and the first network element sends indication information to the second network element, where the indication information includes a sequence number of the at least one PDCP data packet. After the second network element receives the indication information, the second network element sends a reconfiguration instruction to the terminal, and sends the at least one PDCP data packet to the first network element according to the sequence number of the at least one PDCP data packet. After the terminal receives the reconfiguration instruction, the terminal reconfigures the first network element.

It should be noted that one bearer of the terminal is used as an example in the foregoing for description. However, each terminal may be configured with one bearer, or may be configured with a plurality of bearers. For each terminal, a PDCP reordering time may be configured for each terminal, and a data transmission priority of each bearer may be determined by using the foregoing method, that is, may be determined according to the PDCP reordering time of the terminal and a waiting time of a PDCP data packet corresponding to the bearer. Therefore, transmission priorities of PDCP data packets of different bearers of a same terminal may be different.

It can be learned that in this embodiment of the present application, the second network element receives the PDCP reordering time of the terminal sent by the first network element, and receives the PDCP data packet of the terminal sent by the first network element, and the second network element determines the transmission priority of the PDCP data packet of the terminal according to the PDCP reordering time of the terminal. It can be learned that after configuring the PDCP reordering time of the terminal for the terminal, the first network element further sends the PDCP reordering time of the terminal to the second network element. In comparison with the prior art, in this solution, the second network element may determine the transmission priority of the PDCP data packet of the terminal according to the PDCP reordering time of the terminal, so that a data packet loss is reduced.

Figure 4:
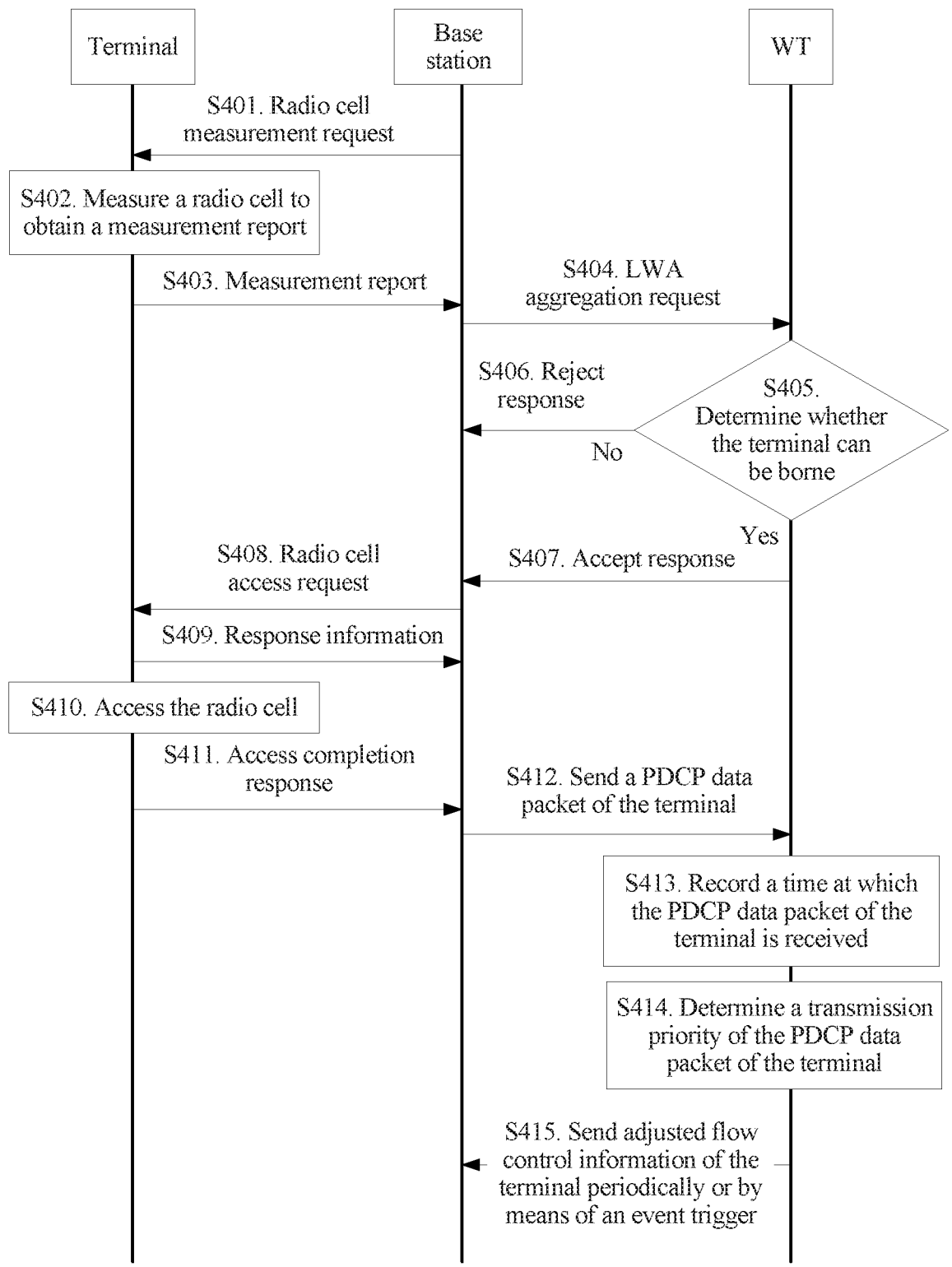
FIG. 4 is a schematic flowchart of an LWA system-based data transmission method according to an embodiment of the present application.

For example, referring to FIG. 4, FIG. 4 is a schematic flowchart of an LWA system-based data transmission method. A first network element is a base station, and a second network element is a WT. The method includes the following steps.

S401. The base station sends a radio cell measurement request to a terminal, where the radio cell measurement request carries a measurement configuration parameter.

Optionally, the measurement configuration parameter includes an identifier of a radio cell, a preset signal strength, and the like. The radio cell is a WiFi cell, and the identifier of the radio cell may be a basic service set identifier (BSSID) or the like. There may be one or more identifiers of radio cells, and this is not limited in the present application.

S402. The terminal receives the radio cell measurement request sent by the base station, and the terminal performs radio cell measurement according to the measurement configuration parameter carried in the radio cell measurement request to obtain a measurement report.

Optionally, a specific implementation in which the terminal performs the radio cell measurement according to the measurement configuration parameter to obtain the measurement report may be as follows: The terminal obtains a signal strength of a radio cell corresponding to the identifier of the radio cell; the UE determines a target radio cell, where the target radio cell is a radio cell of which a signal strength is greater than or equal to the preset signal strength; and the UE generates the measurement report according to configuration information of the target radio cell.

The measurement report includes radio cell configuration information, and the radio cell configuration information includes an identifier, a signal strength, and the like of the target radio cell.

S403. The terminal sends the measurement report to the base station.

S404. The base station receives the measurement report sent by the terminal, and the base station sends an LWA aggregation request to the WT according to the measurement report, where the WT is a WT of the target radio cell, and the LWA aggregation request carries a PDCP reordering time of the terminal.

Optionally, if the radio cell configuration information includes a plurality of target radio cells, a specific implementation in which the base station sends the LWA aggregation request to the WT according to the radio cell configuration information may be as follows: The base station sends the LWA aggregation request to WTs of all the target radio cells; or the base station determines a target radio cell with a greatest signal strength according to the radio cell configuration information, and sends the LWA aggregation request to a WT associated with the target radio cell with the greatest signal strength, and so on.

S405. The WT receives the LWA aggregation request sent by the base station, and determines whether the WT can bear the terminal.

If the WT cannot bear the terminal, step S406 is performed.

If the WT can bear the terminal, step S407 is performed.

S406. The WT sends a reject response for the LWA aggregation request to the base station.

S407. The WT sends an accept response for the LWA aggregation request to the base station, where the accept response carries at least one of initial flow control information of the terminal, traffic that is recommended by the WT and that is of sending a PDCP data packet by the base station, and a rate that is recommended by the WT and that is of sending a PDCP data packet by the base station.

S408. The base station receives the accept response sent by the WT, and the base station sends a radio cell access request to the terminal, where the radio cell access request carries configuration information of the radio cell.

S409. The terminal receives the radio cell access request sent by the base station, and the terminal sends response information to the base station, where the response information is used to notify the base station that the terminal has received the radio cell access request.

S410. The terminal accesses the WT according to the configuration information of the radio cell carried in the radio cell access request.

S411. The terminal sends a radio cell access completion response to the base station, where the access completion response is used to notify the base station that the terminal has accessed the WT.

S412. The base station receives the radio cell access completion response sent by the terminal, and the base station sends a PDCP data packet of the terminal to the WT according to at least one of the initial flow control information of the terminal, the traffic recommended by the WT, and the rate recommended by the WT.

S413. The WT receives the PDCP data packet of the terminal sent by the base station, and records a time at which the PDCP data packet of the terminal is received.

S414. The WT determines a transmission priority of the PDCP data packet of the terminal.

S415. The WT sends adjusted flow control information of the terminal to the base station periodically or by means of an event trigger, and the base station receives the adjusted flow control information of the terminal.

It should be noted that in this embodiment of the present application, when step S401 to step S413 are performed, the WT may further perform step S414. For a specific implementation of step S401 to step S414 in this embodiment of the present application, refer to the foregoing data transmission method, and details are not described herein.

Figure 5:
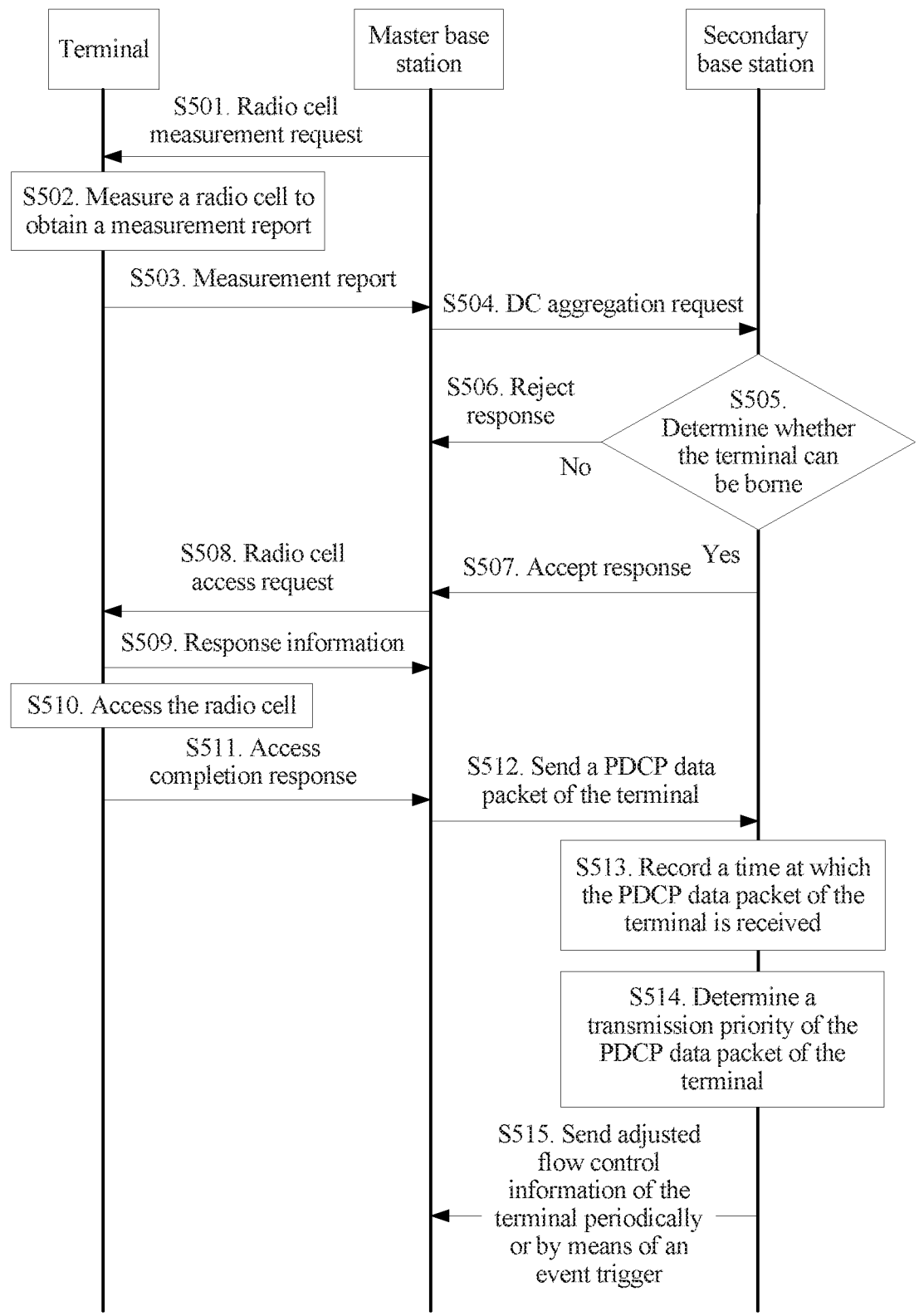
FIG. 5 is a schematic flowchart of a DC system-based data transmission method according to an embodiment of the present application.

For example, referring to FIG. 5, FIG. 5 is a schematic flowchart of a DC system-based data transmission method. A first network element is a master base station, and a second network element is a secondary base station. The method includes the following steps.

S501. The master base station sends a radio cell measurement request to a terminal, where the radio cell measurement request carries a measurement configuration parameter.

Optionally, the measurement configuration parameter includes an identifier of a radio cell, a preset signal strength, and the like. For example, the radio cell is an LTE cell, and the identifier of the radio cell may be a physical cell identifier (PCI) or the like. There may be one or more identifiers of radio cells, and this is not limited in the present application.

S502. The terminal receives the radio cell measurement request sent by the master base station, and the terminal performs radio cell measurement according to the measurement configuration parameter carried in the radio cell measurement request to obtain a measurement report.

Optionally, a specific implementation in which the terminal performs the radio cell measurement according to the measurement configuration parameter to obtain the measurement report may be as follows: The terminal obtains a signal strength of a radio cell corresponding to the identifier of the radio cell; the UE determines a target radio cell, where the target radio cell is a radio cell of which a signal strength is greater than or equal to the preset signal strength; and the UE generates the measurement report according to configuration information of the target radio cell.

The measurement report includes radio cell configuration information, and the radio cell configuration information includes an identifier, the signal strength, and the like of the target radio cell.

S503. The terminal sends the measurement report to the master base station.

S504. The master base station receives the measurement report sent by the terminal, and the master base station sends a DC aggregation request to the secondary base station according to the measurement report, where the secondary base station is a base station in which the target radio cell is located, and the DC aggregation request carries a PDCP reordering time of the terminal and a QoS parameter of the terminal.

Optionally, if the radio cell configuration information includes a plurality of target radio cells, a specific implementation in which the master base station sends the DC aggregation request to the secondary base station according to the radio cell configuration information may be as follows: The master base station sends the DC aggregation request to secondary base stations of all the target radio cells; or the master base station determines a target radio cell with a greatest signal strength according to the radio cell configuration information, and sends the DC aggregation request to a secondary base station associated with the target radio cell with the greatest signal strength, and so on.

S505. The secondary base station receives the DC aggregation request sent by the master base station, and determines whether the secondary base station can bear the terminal.

If the secondary base station cannot bear the terminal, step S506 is performed.

If the secondary base station can bear the terminal, step S507 is performed.

S506. The secondary base station sends a reject response for the DC aggregation request to the master base station.

S507. The secondary base station sends an accept response for the DC aggregation request to the master base station, where the accept response carries at least one of initial flow control information of the terminal, traffic that is recommended by the secondary base station and that is of sending a PDCP data packet by the master base station, and a rate that is recommended by the secondary base station and that is of sending a PDCP data packet by the master base station.

S508. The master base station receives the accept response sent by the secondary base station, and the master base station sends a radio cell access request to the terminal, where the radio cell access request carries configuration information of the radio cell.

S509. The terminal receives the radio cell access request sent by the master base station, and the terminal sends response information to the master base station, where the response information is used to notify the master base station that the terminal has received the radio cell access request.

S510. The terminal accesses the secondary base station according to the configuration information of the radio cell carried in the radio cell access request.

S511. The terminal sends a radio cell access completion response to the master base station, where the access completion response is used to notify the master base station that the terminal has accessed the secondary base station.

S512. The master base station receives the radio cell access completion response sent by the terminal, and the master base station sends a PDCP data packet of the terminal to the secondary base station according to at least one of the initial flow control information of the terminal, the traffic recommended by the secondary base station, and the rate recommended by the secondary base station.

S513. The secondary base station receives the PDCP data packet of the terminal sent by the master base station, and records a time at which the PDCP data packet of the terminal is received.

S514. The secondary base station determines a transmission priority of the PDCP data packet of the terminal.

S515. The secondary base station sends adjusted flow control information of the terminal to the master base station periodically or by means of an event trigger, and the master base station receives the adjusted flow control information of the terminal.

It should be noted that in this embodiment of the present application, when step S501 to step S513 are performed, the secondary base station may further perform step S514. For a specific implementation of step S501 to step S514 in this embodiment of the present application, refer to the foregoing data transmission method, and details are not described herein.

The following describes an apparatus for implementing the foregoing method in the embodiment of the present application with reference to the accompanying drawings.

Figure 6:
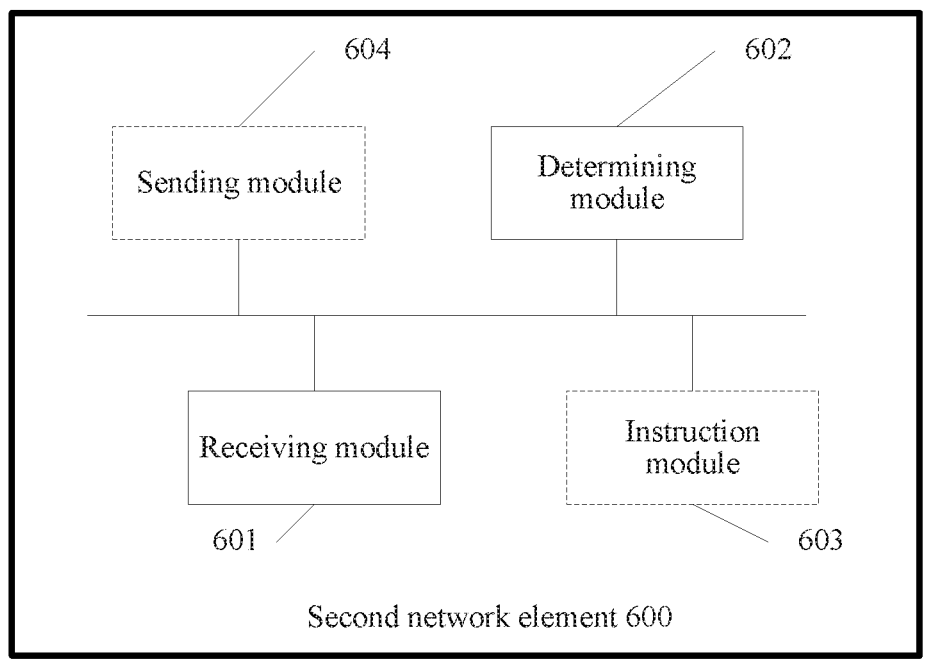
FIG. 6 is a schematic structural diagram of a second network element according to an embodiment of the present application.

Referring to FIG. 6, FIG. 6 is a schematic structural diagram of a second network element according to an embodiment of the present application.

As shown in FIG. 6, the second network element 600 may include a receiving module 601 and a determining module 602.

The receiving module 601 is configured to receive a PDCP reordering time of a terminal sent by a first network element, and is further configured to receive a PDCP data packet of the terminal sent by the first network element.

The determining module 602 is configured to determine a transmission priority of the PDCP data packet of the terminal according to the PDCP reordering time of the terminal.

A manner in which the determining module 602 determines the transmission priority of the PDCP data packet of the terminal may be the same as that in the foregoing method embodiment.

For example, the determining module 602 is specifically configured to:

determine remaining duration of the PDCP reordering time of the terminal; and determine the transmission priority of the PDCP data packet of the terminal according to the remaining duration, where the remaining duration is a difference between the PDCP reordering time and a waiting time of the PDCP data packet on the second network element.

Larger remaining duration of the PDCP reordering time leads to a lower transmission priority of the PDCP data packet of the terminal. For example, when the remaining duration of the PDCP reordering time of the terminal is less than remaining duration of a PDCP reordering time of another terminal, the transmission priority of the PDCP data packet of the terminal is greater than a transmission priority of a PDCP data packet of the another terminal. Alternatively, when the remaining duration of the PDCP reordering time of the terminal is greater than remaining duration of a PDCP reordering time of another terminal, the transmission priority of the PDCP data packet of the terminal is less than a transmission priority of a PDCP data packet of the another terminal.

Optionally, the second network element shown in FIG. 6 further includes an instruction module 603, configured to instruct the first network element to perform flow control on the PDCP data packet sent to the second network element. The instruction module 603 may be, for example, a first instruction module or a second instruction module.

The first instruction module is configured to: when a difference between a sequence number of a latest PDCP data packet received by the second network element and a sequence number of an un-sent earliest PDCP data packet received by the second network element is greater than or equal to a maximum sending quantity of PDCP data packets within the PDCP reordering time of the terminal, instruct the first network element to send a decreasing quantity of PDCP data packets or stop sending a PDCP data packet to the second network element, where the latest PDCP data packet and the earliest PDCP data packet are PDCP data packets on a same bearer of the terminal.

The second instruction module is configured to: when the remaining duration of the PDCP reordering time of the terminal is less than or equal to a preset threshold, instruct the first network element to send a decreasing quantity of PDCP data packets or stop sending a PDCP data packet to the second network element.

Alternatively, the instruction module 603 may include both the first instruction module and the second instruction module. That is, when any of the foregoing conditions is satisfied, the first network element is instructed to perform flow control on the PDCP data packet sent to the second network element.

Optionally, similar to the foregoing method embodiment, the receiving module 601 is specifically configured to:

receive an aggregation request sent by the first network element, where the aggregation request carries the PDCP reordering time of the terminal.

In addition, the second network element may further include a sending module 604, configured to: after the receiving module 601 receives the aggregation request sent by the first network element, determine whether the second network element can bear the terminal, and respond to the aggregation request according to a determining result; and when the second network element can bear the terminal, send an accept response to the first network element, or when the second network element cannot bear the terminal, send a reject response to the first network element. The response message may include at least one of initial flow control information of the terminal, traffic that is recommended by the second network element and that is of sending the PDCP data packet by the first network element to the second network element, and a rate that is recommended by the second network element and that is of sending the PDCP data packet by the first network element to the second network element.

Certainly, the initial flow control information of the terminal, the recommended traffic, or the recommended rate may be sent to the first network element in another manner, for example, sent to the first network element by using a newly added message, or sent to the first network element by using another message.

Optionally, after the sending module 604 is configured to send the accept response to the first network element, the sending module 604 is further configured to send adjusted flow control information of the terminal to the first network element periodically or by means of an event trigger.

In addition, the flow control information includes at least one of a rate of splitting the PDCP data packet of the terminal by the second network element, a quantity of PDCP data packets of the terminal split by the second network element, and a packet length of the PDCP data packet of the terminal split by the second network element. The rate of splitting the PDCP data packet of the terminal is determined by the second network element according to a capability of sending data by using an air interface of the terminal and a buffer size used by the terminal on the second network element. The quantity of the split PDCP data packets of the terminal is determined by the second network element according to a quantity of times that the terminal can be scheduled. The packet length of the split PDCP data packet of the terminal is determined by the second network element according to a capability of sending the data packet by the terminal.

Optionally, the receiving module 601 is further configured to receive indication information sent by the first network element when at least one PDCP data packet of the terminal fails to be sent within a preset quantity of retransmission times, where the indication information includes a sequence number of the at least one PDCP data packet. The sending module 604 is further configured to: send a reconfiguration instruction to the terminal, and send the at least one PDCP data packet to the first network element according to the sequence number of the at least one PDCP data packet, where the reconfiguration instruction is used to instruct the terminal to reconfigure the first network element.

It should be noted that the foregoing modules (the receiving module 601, the determining module 602, the instruction module 603, and the sending module 604) are configured to perform related steps of the foregoing method.

In this embodiment, the second network element 600 is presented in a module form. The "module" herein may refer to an application-specific integrated circuit (ASIC), a processor and a memory that execute one or more software or firmware programs, an integrated logic circuit, and/or another component that can provide the foregoing functions. In addition, the foregoing receiving module 601 and the sending module 604 may receive, by using a communications interface between the second network element and the first network element, information sent by the first network element, and the sending module 604 and the instruction module 603 may send information to the first network element by using the communications interface between the second network element and the first network element.

Figure 7:
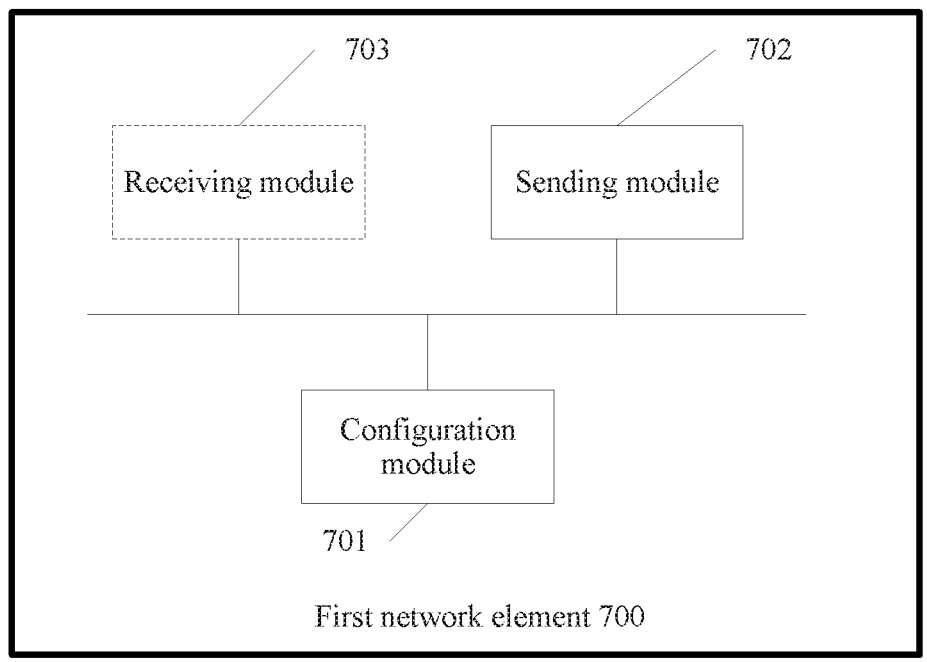
FIG. 7 is a schematic structural diagram of a first network element according to an embodiment of the present application.

Referring to FIG. 7, FIG. 7 is a schematic structural diagram of a first network element according to an embodiment of the present application.

As shown in FIG. 7, the first network element 700 may include a configuration module 701 and a sending module 702.

The configuration module 701 is configured to configure a PDCP reordering time for a terminal.

The sending module 702 is configured to send the PDCP reordering time of the terminal configured by the configuration module to a second network element.

The sending module 702 is further configured to send a PDCP data packet of the terminal to the second network element, where the PDCP reordering time of the terminal is used to determine a transmission priority of the PDCP data packet of the terminal on the second network element.

Optionally, when the first network element receives an instruction, sent by the second network element, that is used to instruct to send a decreasing quantity of PDCP data packets or stop sending a PDCP data packet to the second network element, the sending module 702 sends a decreasing quantity of PDCP data packets or stops sending a PDCP data packet to the second network element.

Optionally, the sending module 702 may send the PDCP reordering time of the terminal to the second network element by using an aggregation request.

Optionally, the first network element further includes a receiving module 703, configured to receive a response message that is sent by the second network element and that is of the aggregation request, where the response message includes at least one of initial flow control information of the terminal, traffic that is recommended by the second network element and that is of sending the PDCP data packet by the first network element to the second network element, and a rate that is recommended by the second network element and that is of sending the PDCP data packet by the first network element to the second network element. In this way, the sending module 702 may send the PDCP data packet of the terminal to the second network element according to the recommended traffic or rate.

Optionally, after the receiving module 703 receives the response message that is sent by the second network element and that is of the aggregation request, the receiving module 703 is further configured to receive adjusted flow control information of the terminal sent by the second network element periodically or by means of an event trigger.

In addition, the flow control information includes at least one of a rate of splitting the PDCP data packet of the terminal by the second network element, a quantity of PDCP data packets of the terminal split by the second network element, and a packet length of the PDCP data packet of the terminal split by the second network element. The rate of splitting the PDCP data packet of the terminal is determined by the second network element according to a capability of sending data by using an air interface of the terminal and a buffer size used by the terminal on the second network element. The quantity of the split PDCP data packets of the terminal is determined by the second network element according to a quantity of times that the terminal can be scheduled. The packet length of the split PDCP data packet of the terminal is determined by the second network element according to a capability of sending the data packet by the terminal.

Optionally, the sending module 702 is further configured to: if at least one PDCP data packet of the terminal fails to be sent within a preset quantity of retransmission times, send indication information to the second network element, where the indication information includes a sequence number of the at least one PDCP data packet, and the indication information is used to instruct the second network element to trigger the terminal to reconfigure the first network element and instruct the second network element to deliver the at least one PDCP data packet according to the sequence number of the at least one PDCP data packet.

It should be noted that the foregoing modules (the configuration module 701, the sending module 702, and the receiving module 703) are configured to perform related steps of the foregoing method.

In this embodiment, the first network element 700 is presented in a module form. The "module" herein may refer to an application-specific integrated circuit (ASIC), a processor and a memory that execute one or more software or firmware programs, an integrated logic circuit, and/or another component that can provide the foregoing functions. In addition, the sending module 702 and the receiving module 703 are respectively configured to send information to the first network element and receive information from the first network element by using a communications interface between the first network element and the second network element. The communications interface is, for example, a wired interface, or certainly may be a wireless interface.

Figure 8:
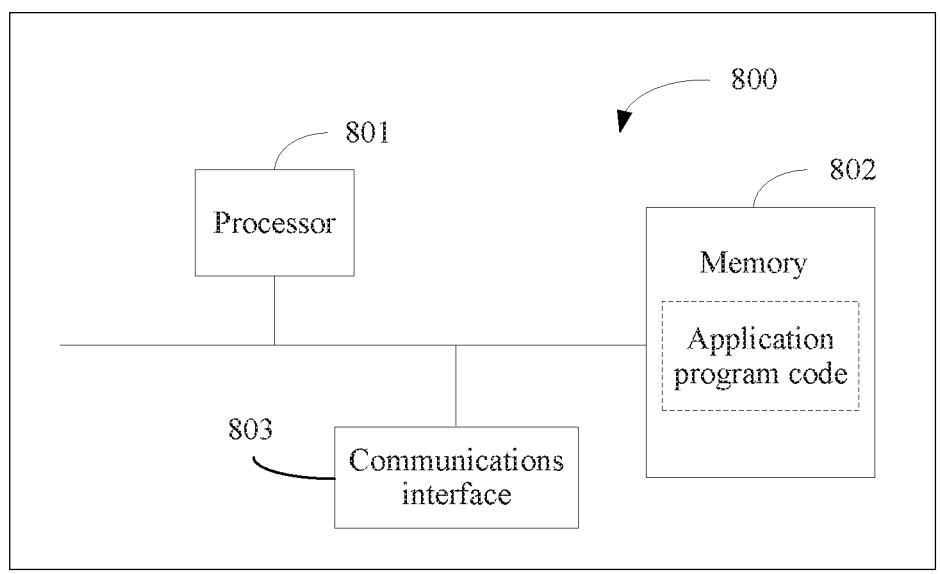
FIG. 8 is a schematic structural diagram of a network element according to an embodiment of the present application.

In a simple embodiment, a person skilled in the art may figure out that the second network element 600 and the first network element 700 may use a form shown in FIG. 8.

As shown in FIG. 8, the first network element 700 and the second network element 600 may be implemented by using a structure in FIG. 8. The network element 800 includes at least one processor 801, at least one memory 802, and at least one communications interface 803. In addition, the network element may further include a general component such as an antenna, and details are not described herein.

The processor 801 may be a general-purpose central processing unit (CPU), a microprocessor, an application-specific integrated circuit ASIC), or one or more integrated circuits configured to control program execution of the foregoing solution.

The communications interface 803 is configured to communicate with another device or communications network, such as an Ethernet network, a radio access network (RAN), or a wireless local area network (WLAN).

The memory 802 may be a read-only memory (ROM), or another type of static storage device that can store static information and a static instruction, or a random access memory (RAM), or another type of dynamic storage device that can store information and an instruction; or may be an electrically erasable programmable read-only memory (EEPROM), a compact disc read-only memory (CD-ROM) or another optical disk storage or optical disc storage (including a compact disc, a laser disc, an optical disc, a digital versatile disc, a Blu-ray disc, and the like), a disk storage medium or another magnetic storage device, or any other medium that can be used to carry or store expected program code in a form of an instruction or a data structure and that can be accessed by a computer. However, this is not limited herein. The memory may exist independently and is connected to the processor by using the bus. The memory may also be integrated with the processor.

The memory 802 is configured to store application program code that is used to execute the foregoing solution, and the processor 801 controls and executes the application program code. The processor 801 is configured to execute the application program code stored in the memory 802.

When the network element shown in FIG. 8 is the second network element, the code stored in the memory 802 may be used to perform the data transmission method performed by the foregoing second network element. For example, the second network element determines a transmission priority of a PDCP data packet of a terminal according to a PDCP reordering time of the terminal sent by the first network element.

When the second network element is a base station, the processor 801 may be a processor on a board of the base station, or may be one or more integrated circuits or chips on a board of the base station. When the second network element is a WT, the processor 801 may be a processor of an apparatus in which the WT is located, for example, a WLAN AC, a WLAN gateway, or a WLAN AP, or may be one or more integrated circuits or chips of an apparatus in which the WT is located. In addition, the memory 802 may be integrated with the processor 801, or may be disposed separately.

When the network element shown in FIG. 8 is the first network element, the code stored in the memory 802 may be used to perform the data transmission method performed by the foregoing first network element. For example, the first network element sends a PDCP reordering time of a terminal to the second network element, so that the second network element determines a transmission priority of a PDCP data packet of the terminal according to the PDCP reordering time of the terminal.

When the first network element is a base station, the processor 801 may be a processor on a board of the base station, or may be one or more integrated circuits or chips on a board of the base station. In addition, the memory 802 may be integrated with the processor 801, or may be disposed separately.

An embodiment of the present application further provides a computer storage medium, which is configured to store a computer software instruction used by the first network element. The computer software instruction includes a program designed for executing the method embodiment. Data transmission may be implemented by executing the stored program.

An embodiment of the present application further provides a computer storage medium, which is configured to store a computer software instruction used by the second network element. The computer software instruction includes a program designed for executing the method embodiment. Data transmission may be implemented by executing the stored program.

Although the present application is described with reference to the embodiments, in a process of implementing the present application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

A person skilled in the art should understand that the embodiments of the present application may be provided as a method, an apparatus (device), or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code. The computer program is stored/distributed in a proper medium and is provided as or used as a part of the hardware together with another hardware, or may also use another allocation form, such as by using the Internet or another wired or wireless telecommunications system.

The present application is described with reference to the flowcharts and/or block diagrams of the method, the apparatus (device), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present application is described with reference to specific features and the embodiments thereof, obviously, various modifications and combinations may be made to them without departing from the spirit and scope of the present application. Correspondingly, the specification and accompanying drawings are merely examples of description of the present application defined by the accompanying claims, and is considered as any of or all modifications, variations, combinations or equivalents that cover the scope of the present application. Obviously, a person skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. A data transmission method, comprising:
receiving, by a second network element from a first network element, a Packet Data Convergence Protocol (PDCP) reordering time of a terminal, wherein the terminal is communicatively connected to the first network element and the second network element;
receiving, by the second network element from the first network element, a PDCP data packet of the terminal; and
determining, by the second network element, a transmission priority of the PDCP data packet of the terminal according to the PDCP reordering time of the terminal, wherein the determining the transmission priority of the PDCP data packet comprises:
determining, by the second network element, remaining duration of the PDCP reordering time of the terminal; and
determining, by the second network element, the transmission priority of the PDCP data packet of the terminal according to the remaining duration, wherein the remaining duration is a difference between the PDCP reordering time and a waiting time of the PDCP data packet on the second network element, wherein the waiting time is based on a time at which the PDCP data packet is received by the second network element from the first network element.

2. The method according to claim 1, wherein:
in response to determining that the remaining duration of the PDCP reordering time of the terminal is less than remaining duration of a PDCP reordering time of another terminal, the transmission priority of the PDCP data packet of the terminal is greater than a transmission priority of a PDCP data packet of the another terminal; or
in response to determining that the remaining duration of the PDCP reordering time of the terminal is greater than remaining duration of a PDCP reordering time of another terminal, the transmission priority of the PDCP data packet of the terminal is less than a transmission priority of a PDCP data packet of the another terminal.

3. The method according to claim 1, further comprising:
in response to determining that the remaining duration of the PDCP reordering time of the terminal is less than or equal to a preset threshold, instructing, by the second network element, the first network element to send a decreasing quantity of PDCP data packets or stop sending a PDCP data packet to the second network element.

4. The method according to claim 1, further comprising:
in response to determining that a difference between a sequence number of a latest PDCP data packet received by the second network element and a sequence number of an un-sent earliest PDCP data packet received by the second network element is greater than or equal to a maximum sending quantity of PDCP data packets within the PDCP reordering time of the terminal, instructing, by the second network element, the first network element to send a decreasing quantity of PDCP data packets or stop sending a PDCP data packet to the second network element, wherein the latest PDCP data packet and the earliest PDCP data packet are PDCP data packets on a same bearer of the terminal.

5. The method according to claim 1, wherein the receiving the PDCP reordering time comprises:
receiving, by the second network element, an aggregation request sent by the first network element, wherein the aggregation request carries the PDCP reordering time of the terminal.

6. The method according to claim 5, further comprising:
sending, by the second network element, a response message of the aggregation request to the first network element, wherein the response message comprises at least one of initial flow control information of the terminal, traffic that is recommended by the second network element and that is of sending the PDCP data packet by the first network element to the second network element, and a rate that is recommended by the second network element and that is of sending the PDCP data packet by the first network element to the second network element.

7. A network element comprising a processor and a non-transitory computer readable storage medium, the non-transitory computer readable storage medium storing a program, and in response to the program being executed by the processor, the following steps are performed:
- configuring a Packet Data Convergence Protocol (PDCP) reordering time for a terminal, wherein the network element is used in a PDCP splitting system that comprises a first network element and a second network element, wherein the terminal is communicatively connected to the first network element and the second network element, wherein the first network element is configured to perform PDCP processing on data of the terminal to obtain a PDCP data packet, wherein the second network element is configured to split the PDCP data packet obtained by the first network element, and wherein the network element is the first network element;
- sending the PDCP reordering time of the terminal to the second network element;
- sending the PDCP data packet of the terminal to the second network element, wherein the PDCP reordering time of the terminal is used to determine a transmission priority of the PDCP data packet of the terminal on the second network element;
- after sending the PDCP data packet of the terminal to the second network element, receiving an instruction sent by the second network element, wherein the instruction instructs the first network element to send a decreasing quantity of PDCP data packets or stop sending a PDCP data packet to the second network element; and
- sending a decreasing quantity of PDCP data packets or stop sending a PDCP data packet to the second network element based on the instruction.

8. The network element according to claim 7, wherein the PDCP reordering time of the terminal is sent to the second network element in an aggregation request.

9. The network element according to claim 8, wherein in response to the program being executed by the processor, the following steps are further performed:
- receiving a response message that is sent by the second network element and that is of the aggregation request, wherein the response message comprises at least one of initial flow control information of the terminal, traffic that is recommended by the second network element and that is of sending the PDCP data packet by the first network element to the second network element, and a rate that is recommended by the second network element and that is of sending the PDCP data packet by the first network element to the second network element,
- wherein the PDCP data packet of the terminal is sent to the second network element according to at least one of the initial flow control information of the terminal, the recommended traffic, and the recommended rate.

10. A network element comprising a processor and a non-transitory computer readable storage medium, the non-transitory computer readable storage medium storing a program, and in response to the program being executed by the processor, the following steps are performed:
- receiving a Packet Data Convergence Protocol (PDCP) reordering time of a terminal from a first network element, wherein the network element is used in a PDCP splitting system that comprises the first network element and a second network element, wherein the terminal is communicatively connected to the first network element and the second network element, wherein the first network element is configured to perform PDCP processing on data of the terminal to obtain a PDCP data packet, wherein the second network element is configured to split the PDCP data packet obtained by the first network element, and wherein the network element is the second network element;
- receiving the PDCP data packet of the terminal from the first network element; and
- determining a transmission priority of the PDCP data packet of the terminal according to the PDCP reordering time of the terminal, wherein the determining the transmission priority of the PDCP data packet comprises:
  - determining remaining duration of the PDCP reordering time of the terminal; and
  - determining the transmission priority of the PDCP data packet of the terminal according to the remaining duration, wherein the remaining duration is a difference between the PDCP reordering time and a waiting time of the PDCP data packet on the second network element, wherein the waiting time is based on a time at which the PDCP data packet is received by the second network element from the first network element.

11. The network element according to claim 10, wherein:
- in response to determining that the remaining duration of the PDCP reordering time of the terminal is less than remaining duration of a PDCP reordering time of another terminal, the transmission priority of the PDCP data packet of the terminal is greater than a transmission priority of a PDCP data packet of the another terminal; or
- in response to determining that the remaining duration of the PDCP reordering time of the terminal is greater than remaining duration of a PDCP reordering time of another terminal, the transmission priority of the PDCP data packet of the terminal is less than a transmission priority of a PDCP data packet of the another terminal.

12. The network element according to claim 10, wherein in response to the program being executed by the processor, the following step is further performed:
- instructing, in response to determining that the remaining duration of the PDCP reordering time of the terminal is less than or equal to a preset threshold, the first network element to send a decreasing quantity of PDCP data packets or stop sending a PDCP data packet to the second network element.

13. The network element according to claim 10, wherein in response to the program being executed by the processor, the following step is further performed:
- instructing, in response to determining that a difference between a sequence number of a latest PDCP data packet received by the second network element and a sequence number of an un-sent earliest PDCP data packet received by the second network element is greater than or equal to a maximum sending quantity of PDCP data packets within the PDCP reordering time of the terminal, the first network element to send a decreasing quantity of PDCP data packets or stop sending a PDCP data packet to the second network element, wherein the latest PDCP data packet and the earliest PDCP data packet are PDCP data packets on a same bearer of the terminal.

14. The network element according to claim 10, wherein the PDCP reordering time of the terminal is received in an aggregation request sent by the first network element.

15. The network element according to claim 14, wherein in response to the program being executed by the processor, the following step is further performed:

sending a response message of the aggregation request to the first network element, wherein the response message comprises at least one of initial flow control information of the terminal, traffic that is recommended by the second network element and that is of sending the PDCP data packet by the first network element to the second network element, and a rate that is recommended by the second network element and that is of sending the PDCP data packet by the first network element to the second network element.

16. The network element according to claim 15, wherein in response to the program being executed by the processor, the following step is further performed:

sending adjusted flow control information of the terminal to the first network element periodically or by means of an event trigger.

17. The network element according to claim 16, wherein the adjusted flow control information comprises at least one of a rate of splitting the PDCP data packet of the terminal by the second network element, a quantity of PDCP data packets of the terminal split by the second network element, and a packet length of the PDCP data packet of the terminal split by the second network element, the rate of splitting the PDCP data packet of the terminal is determined by the second network element according to a capability of sending data by using an air interface of the terminal and a buffer size used by the terminal on the second network element, the quantity of the split PDCP data packets of the terminal is determined by the second network element according to a quantity of times that the terminal can be scheduled, and the packet length of the split PDCP data packet of the terminal is determined by the second network element according to a capability of sending the data packet by the terminal.

* * * * *